(12) United States Patent
Mason

(10) Patent No.: US 10,126,551 B2
(45) Date of Patent: Nov. 13, 2018

(54) DISPLAY COMPRISING AN OPTICAL WAVEGUIDE FOR DISPLAYING AN IMAGE

(71) Applicant: BAE SYSTEMS plc, London (GB)

(72) Inventor: Stephen Paul Mason, Rochester (GB)

(73) Assignee: BAE SYSTEMS plc, London (GB)

( * ) Notice: Subject to any disclaimer, the term of this patent is extended or adjusted under 35 U.S.C. 154(b) by 43 days.

(21) Appl. No.: 14/392,317

(22) PCT Filed: Jun. 25, 2014

(86) PCT No.: PCT/GB2014/051930
§ 371 (c)(1),
(2) Date: Dec. 24, 2015

(87) PCT Pub. No.: WO2014/207452
PCT Pub. Date: Dec. 31, 2014

(65) Prior Publication Data
US 2016/0274356 A1 Sep. 22, 2016

(30) Foreign Application Priority Data

Jun. 26, 2013 (EP) ..................................... 13275145
Jun. 26, 2013 (GB) .................................. 1311336.0

(51) Int. Cl.
*G02B 27/14* (2006.01)
*G02B 27/01* (2006.01)
(Continued)

(52) U.S. Cl.
CPC .......... *G02B 27/0101* (2013.01); *G02B 6/00* (2013.01); *G02B 6/005* (2013.01); *G02B 6/0026* (2013.01);
(Continued)

(58) Field of Classification Search
CPC ...... G02B 2027/0123; G02B 2027/015; G02B 2027/0194; G02B 27/0081;
(Continued)

(56) References Cited

U.S. PATENT DOCUMENTS 5,061,032 A * 10/1991 Meltz ................. G02B 6/02085
385/33
5,093,567 A * 3/1992 Staveley ................ A42B 3/042
250/221

(Continued)

FOREIGN PATENT DOCUMENTS

EP 0380035 A2 8/1990
EP 1089111 A1 4/2001
(Continued)

OTHER PUBLICATIONS

International Search Report and Written Opinion received for Patent Application No. PCT/GB2014/051930, dated Oct. 1, 2014. 15 pages.

(Continued)

*Primary Examiner* — William Choi
*Assistant Examiner* — Vipin Patel
(74) *Attorney, Agent, or Firm* — Finch & Maloney PLLC

(57) ABSTRACT

A display apparatus for use in displaying an image to a viewer (4), comprising an optical waveguide (8) arranged to receive image-bearing light (2) into the optical waveguide to guide the received image-bearing light therealong to an output part (5) of the optical waveguide for output therefrom. A combiner (70) is arranged adjacent to the output part of the optical waveguide for reflecting image-bearing light output by the waveguide in a direction which passes back through the optical waveguide and for allowing light (6) from an external scene to pass through the combiner in said direction through the optical waveguide to combine with the (Continued)

reflected image-bearing light so that the image-bearing light overlays light from the external scene for viewing by a viewer.

21 Claims, 3 Drawing Sheets

(51) Int. Cl.
G02B 27/00 (2006.01)
G02B 6/00 (2006.01)
F21V 8/00 (2006.01)
G02B 6/34 (2006.01)

(52) U.S. Cl.
CPC ......... G02B 6/0046 (2013.01); G02B 6/0055 (2013.01); G02B 27/0081 (2013.01); G02B 27/141 (2013.01); G02B 6/34 (2013.01); G02B 2027/015 (2013.01); G02B 2027/0123 (2013.01); G02B 2027/0194 (2013.01)

(58) Field of Classification Search
CPC .... G02B 27/0101; G02B 27/141; G02B 6/00; G02B 6/0026; G02B 6/0046; G02B 6/005
See application file for complete search history.

(56) References Cited

U.S. PATENT DOCUMENTS

| 7,286,272 | B2* | 10/2007 | Mukawa | G02B 5/1876 345/7 |
|---|---|---|---|---|
| 2004/0085649 | A1* | 5/2004 | Repetto | G02B 27/0172 359/633 |
| 2005/0140644 | A1 | 6/2005 | Mukawa | |
| 2006/0039046 | A1 | 2/2006 | Ouchi et al. | |
| 2008/0239422 | A1 | 10/2008 | Noda | |
| 2009/0059380 | A1 | 3/2009 | Moliton | |
| 2010/0111472 | A1 | 5/2010 | DeJong | |
| 2011/0235179 | A1* | 9/2011 | Simmonds | G02B 6/34 359/567 |
| 2012/0069413 | A1 | 3/2012 | Schultz | |
| 2012/0243102 | A1 | 9/2012 | Takeda et al. | |
| 2014/0043689 | A1* | 2/2014 | Mason | G02B 27/0101 359/630 |

FOREIGN PATENT DOCUMENTS

| EP | 1804103 | A1 | 7/2007 |
|---|---|---|---|
| EP | 2515157 | A1 | 10/2012 |
| GB | 2500631 | A | 2/2013 |
| JP | 59164518 | A | 9/1984 |
| JP | H08113059 | A | 5/1996 |
| WO | 9521391 | | 8/1995 |
| WO | 2010119240 | A1 | 10/2010 |
| WO | 2012143701 | A1 | 10/2012 |
| WO | 2014207452 | A1 | 12/2014 |

OTHER PUBLICATIONS

GB Intellectual Property Office Search Report under Section 17(5) received for GB Patent Application No. 1311336.0 dated Dec. 13, 2013. 4 pages.
Extended European Search Report received for EP Patent Application No. 13275145.4 dated Dec. 10, 2013. 7 pages.
International Preliminary Report on Patentability received for Patent Application No. PCT/GB2014/051930, dated Jan. 7, 2016. 9 pages.

* cited by examiner

DISPLAY COMPRISING AN OPTICAL WAVEGUIDE FOR DISPLAYING AN IMAGE

FIELD OF THE INVENTION

The invention relates to displays and methods for displaying an image for viewing by a user. In particular, though not exclusively, the invention is suitable for projection displays such as for use in a head-up display or otherwise.

BACKGROUND

Waveguide displays are particularly useful in providing a means for displaying an image in a region of limited space. In a waveguide display, image-bearing light is injected into a waveguide and is subsequently released from the waveguide for viewing, for example a helmet-mounted or head-up display device.

In such devices, image-bearing light may be focussed at infinity, and a viewer views/receives the released light directly. In this way, the viewer focusses on an image seen by looking at/through the transparent waveguide output area and this permits light from an ambient, external and real-world scene to also enter the viewers eye through the waveguide output area (without being guided). In this way, a desired image may be seen to overlay the external scene. Optical waveguides for display devices of this type often initially insert image-bearing light into the waveguide by a process of diffraction, such that inserted light propagates along the waveguide by total internal reflection towards an output part arranged to release guided light from the waveguide by a further process of diffraction, for viewing. These waveguides may be slim, such as a slab waveguide or rod waveguide, and therefore occupy relatively little volume. FIG. 1 schematically shows an example of this. A slab optical waveguide 1 is orientated vertically and receives image-bearing light 2 at an uppermost input region 3 of the waveguide, generally above the viewer 4, for guiding to a lower output region 5 generally in front of the viewer, in a direction towards a viewer.

Light 6 from an external scene is able to pass through the output part of the waveguide towards the viewer such that the image-bearing light overlays the external scene as seen by the viewer.

Because the output direction of image-bearing light output from the output part of the waveguide is generally perpendicular to the plane of the waveguide 1, this dictates that the waveguide must be generally vertical to permit output light to be viewed in the horizontal—a desired orientation in head-up displays. This can be problematic where there is limited vertical space/height available in a vehicle/aircraft, or on a helmet, for accommodating the waveguide.

An alternative arrangement is shown in FIG. 2 in which the waveguide 1 is orientated in the horizontal plane above the viewer, who no longer views the output part of the waveguide directly. A combiner 7 is located in front of the viewer and comprises a flat sheet of material (e.g. a glass) generally reflective to the image-bearing light while being generally transmissive to external light 7 from an external scene. The combiner is thereby able to combine image-bearing light (reflected) and light from an external scene (transmitted) for concurrent viewing by the viewer.

However, this overhead positioning of the waveguide can lead to head-clearance limitations and problems for a viewer. Furthermore, the distance between the waveguide output part and the combiner results in an increased path length for image-bearing light from the output of the waveguide to the viewer's eye. This has the result of reducing the instantaneous field of view seen by the viewer.

The invention aims to provide an improved waveguide display.

SUMMARY OF THE INVENTION

At its most general, the invention is to position a waveguide display unit between a combiner unit and the intended viewing position of a user, and to direct the output of the waveguide display unit towards the combiner unit for back-reflection to the viewer through the waveguide display unit.

This somewhat counter-intuitive geometry has been found to be surprisingly effective and permits a compact arrangement of the waveguide display unit and combiner unit which is generally desirable, especially in space-limited environments such as within vehicles or aircraft (e.g. a cockpit).

In a first aspect, the invention may provide a display apparatus for use in displaying an image to a viewer, comprising an optical waveguide arranged to receive image-bearing light into the optical waveguide to guide the received image-bearing light therealong to an output part of the optical waveguide for output therefrom, and a combiner arranged adjacent to the output part of the optical waveguide for reflecting image-bearing light output by the waveguide in a direction which passes back through the optical waveguide and for allowing light from an external scene to pass through the combiner in said direction through the optical waveguide to combine with the reflected image-bearing light so that the image-bearing light overlays light from the external scene for viewing by a viewer.

The output part of the optical waveguide may be substantially planar and arranged to output the image-bearing light in an output direction which is substantially perpendicular to the plane thereof. The combiner may have a generally planar surface which is orientated obliquely relative to the plane of the output part for said reflecting of image-bearing light obliquely. The optical waveguide may be substantially planar and the combiner may be substantially planar, and the optical waveguide and the combiner may be mutually orientated to converge towards each other at or adjacent the output part of the optical waveguide. The optical waveguide may be substantially transparent to light conveying the image-bearing light and the external scene. The combiner may be substantially transparent to light conveying the external scene and more reflective than transmissive to light conveying the image-bearing light.

The combiner may include a reflective coating which is predominantly reflective to image-bearing light (e.g. at optical wavelengths conveying that light) and predominantly transmissive to light conveying the external scene (e.g. at optical wavelengths conveying that).

This helps to increase the reflection of image-bearing light therefrom and the transmission of light conveying the external scene therethrough.

The combiner may include an anti-reflective coating which is predominantly transmissive at optical wavelengths conveying the external scene, thereby to increase the efficiency of transmission of light conveying the external scene therethrough.

The waveguide may include an input diffraction grating for receiving image-bearing light and directing the received image-bearing light into the optical waveguide by diffraction, for guiding therealong.

The waveguide may include an intermediate diffraction grating between the input diffraction grating and the output part for receiving image-bearing light from the input diffraction grating and expanding the image-bearing light in a first dimension generally transverse to the direction of guidance of light towards the output part. The output part may include an output diffraction grating for expanding the image-bearing light in a second dimension generally transverse to the first dimension, and to output the result by diffraction.

The display apparatus may include an image source arranged for providing an image-bearing light output, for input to the optical waveguide.

The optical waveguide may be a plate-like waveguide arranged to guide light therealong by total internal reflection between opposing substantially parallel sides of the waveguide.

The optical waveguide is a rod-like waveguide arranged to guide light therealong by total internal reflection between opposing substantially parallel sides of the waveguide.

The invention may provide a projection display apparatus comprising the display apparatus described above for projecting the image-bearing light and light from a said external scene concurrently to a viewer so that the image-bearing light overlays light from the external scene for viewing by the viewer.

In another aspect, the invention may provide an aircraft or vehicle including a transparent canopy or windscreen and a display apparatus or projection display apparatus as described above wherein the combiner is located and arranged to allow an occupant to view though the combiner and through the optical waveguide the external scene being a scene external to the aircraft or vehicle, so that the image-bearing light overlays light from the external scene.

In yet another aspect, the invention may provide a method for displaying an image to a viewer, comprising providing an optical waveguide and receiving image-bearing light into the optical waveguide to guide the received image-bearing light therealong to an output part of the optical waveguide and outputting the received image-bearing light therefrom, and providing a combiner arranged adjacent to the output part of the optical waveguide and reflecting image-bearing light output by the waveguide in a direction which passes back through the optical waveguide and allowing light from an external scene to pass through the combiner in said direction through the optical waveguide to combine with the reflected image-bearing light so that the image-bearing light overlays light from the external scene for viewing by a viewer.

The display apparatus, or projection display apparatus may form a part of a Head-Up Display (HUD).

BRIEF DESCRIPTION OF THE DRAWINGS

Non-limiting examples of the invention will now be described, to better illustrate examples of the invention in preferred embodiments with reference to the accompanying drawings, of which.

DETAILED DESCRIPTION

Figure 1:
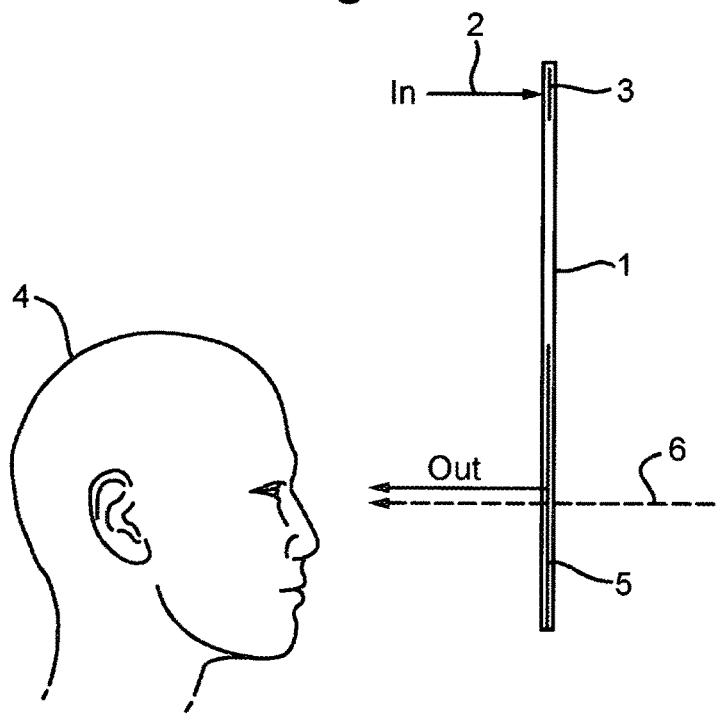
FIG. 1 schematically shows a waveguide display unit positioned for direct viewing of an output image.
Figure 2:
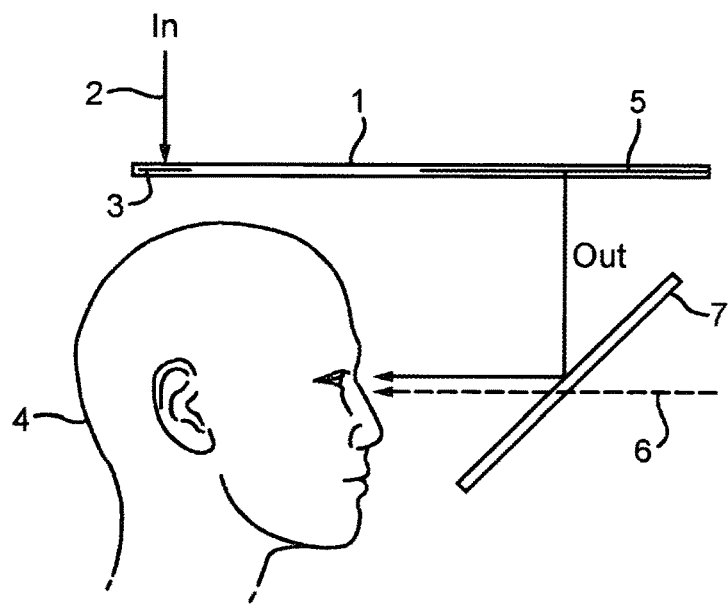
FIG. 2 schematically shows a waveguide display unit positioned for indirect viewing of an output image via a combiner unit.
Figure 3:
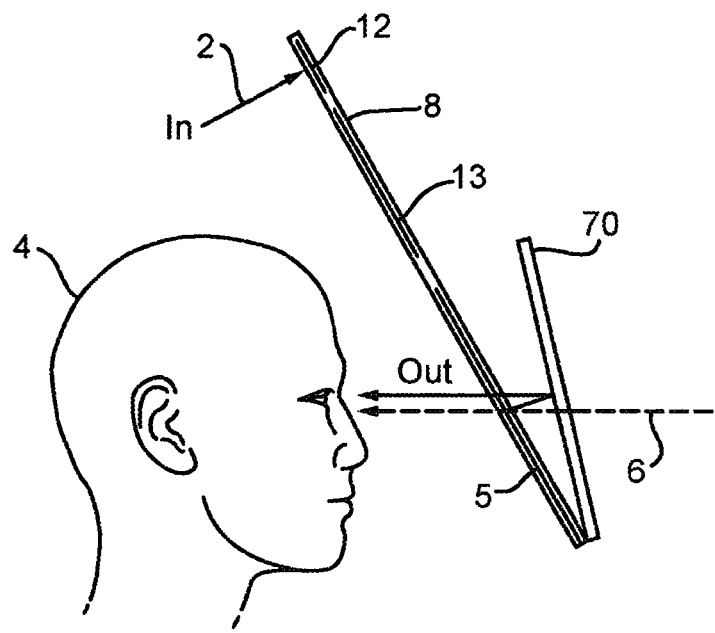
FIG. 3 schematically shows a preferred embodiment of the invention comprising a waveguide display unit positioned for indirect viewing of an output image via a combiner unit.

FIG. 3 shows a schematic view of a display apparatus according to an embodiment of the present invention.

Figure 5:
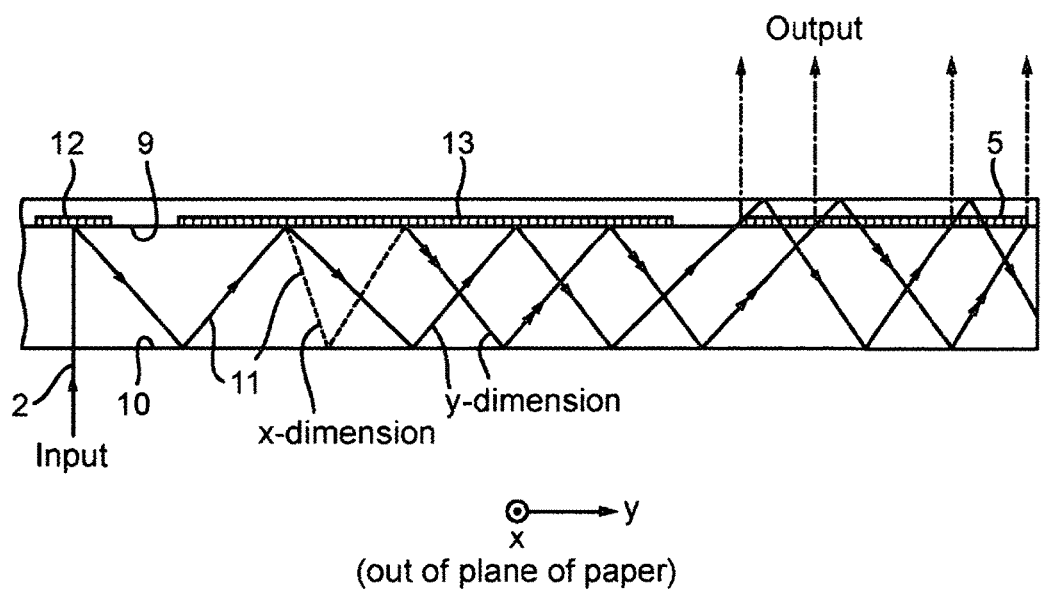
FIG. 5 schematically shows a slab optical waveguide.

A planar slab waveguide display unit 8 is positioned within a cock-pit of an aircraft (or cabin of a vehicle) between a combiner unit 70 and the intended viewing position of a viewer 4 (e.g. pilot or driver). The waveguide unit is arranged such is shown in detail in FIG. 5, which shows a schematic view of the optical waveguide according to an embodiment of the invention.

The planar (e.g. slab) waveguide 8 provides flat opposite surfaces (9, 10) for guiding light rays 11 along the waveguide between the opposing surfaces by successive total internal reflection (TIR) at alternate surfaces internally. An input light ray 2 is directed into the waveguide at a low angle of incidence which is insufficiently oblique to either of the opposing surfaces of the waveguide to permit TIR there. An input diffraction grating 12 is positioned upon a surface of the waveguide to receive the input light 2 and to diffract the received light in a direction forming an angle of incidence to the opposing surfaces (9, 10) of the waveguide internally which permits TIR. Guiding of the light ray 2 ensues until the guided light is incident upon an output diffraction grating 5 arranged upon the same surface 9 of the waveguide bearing the input grating 12. The output grating diffracts received light in a direction forming an angle of incidence to the opposite surface 10 of the waveguide internally which does not permit TIR, and the light ray is output from the waveguide for viewing. Image-bearing light may be focussed at infinity.

The waveguide includes an intermediate diffraction grating 13 between the input diffraction grating and the output part for receiving image-bearing light from the input diffraction grating and expanding the image-bearing light in a first dimension generally transverse to the direction of guidance of light towards the output grating.

The output diffraction grating is arranged to then expand the image-bearing light from the intermediate grating in a second dimension generally transverse to the first dimension (e.g. in the direction of guidance of light), and to output the result by diffraction.

In this way, a small input pupil of image-bearing light may be expanded in two mutually perpendicular directions to produce an expanded exit pupil of image-bearing light for viewing. An example of a suitable such planar waveguide is described in international patent application number PCT/GB2010/000734, published as WO2010/119240A1 on 21 Oct. 2010, entitled "Optical Waveguide and Display Device". Alternatively, The display apparatus includes an image source (not shown) arranged for providing an image-bearing light output, preferably collimated, for input to the optical waveguide. Image sources suitable for this purpose are readily available to the skilled person and will not be described here.

In more detail, the orientation of the grooves of the intermediate grating are inclined at an angle of e.g. 60° to the short/width axis (the "x-dimension") of the waveguide. Image-bearing light incident on the input diffraction grating is diffracted and directed such that the chief ray of the image-bearing light propagates and is incident on the grooves of the intermediate diffraction region at e.g. 30° to the normal to the grooves.

The image-bearing light is partially diffracted and expanded in a first dimension, herein the x-dimension, and turned to propagate through the waveguide to a low efficiency (2% to 20%) output diffraction grating 5 having grating lines/grooves lying in the x-direction. The diffracted rays of image-bearing light are incident substantially normally on this grating and are partially diffracted out of the waveguide, the partial diffraction serves to expand the input pupil in a second dimension, here the long axis (the "y-dimension").

Generally, a diffractive grating or surface can exhibit large amounts of dispersion of incident image bearing light.

This can result in light rays having the same or similar field angles, but which differ in wavelength, being diffracted into different angles into, within or from a waveguide assembly, causing potentially large amounts of chromatic aberration at an output of a display. However, if the dispersion associated with an input grating to a waveguide is substantially matched in an opposing sense with the dispersion associated with an output grating from the waveguide, then the net chromatic dispersion will approach or substantially equal zero.

The correct matching of the diffractive gratings of the waveguide has the effect of mitigating chromatic aberration. In the waveguide assembly of preferred embodiments of the invention, the net chromatic aberration caused by the three diffraction regions shown in FIG. 5 may preferably be zero or substantially zero. For example, the input grating 12 and intermediate grating 13 may be matched with the output grating 5 to provide a net chromatic dispersion of substantially zero. This result is advantageous for a head-up display or a display used in head mounted or helmet mounted applications that incorporate such a waveguide assembly as it allows the use of a small, cheap and broadband image generating light source in place of a relatively costly, bulky and high powered monochromatic light source, for example a laser, to illuminate the waveguide assembly. Such a result also allows the display apparatus to correctly present multiple colour or full colour display images or information to a viewer.

It can be shown that the output angle $\theta_o$ of light output by the output grating is related to the input angle $\theta_i$, of light input into the input grating, by the equation:

$$\sin(\theta_o) = \lambda \left( \frac{1}{d_i} - \frac{1}{d_o} \right) + \sin(\theta_i)$$

Where $d_i$ and $d_o$ are the periods of the input and output gratings respectively.

Accordingly, if the periods of the gratings are the same, the term above multiplied by $\lambda$ cancels and $\theta_o$ equals $\theta_i$. Thus the grating periods may be matched to avoid chromatic aberration for light sources other than monochromatic sources such as a laser. It will be appreciated that if it is required to match the gratings in this way to avoid chromatic aberration, light should be output from the waveguide generally perpendicularly and this being the case, it is not possible to match the gratings and also output the light at an angle other than generally 90 degrees. However, in the present invention, the additional combiner and the waveguide can be mutually orientated to occupy space efficiently even when subject to the restriction of a 90 degree output angle from the waveguide, and therefore the invention provides a noticeable advantage.

Figure 4:
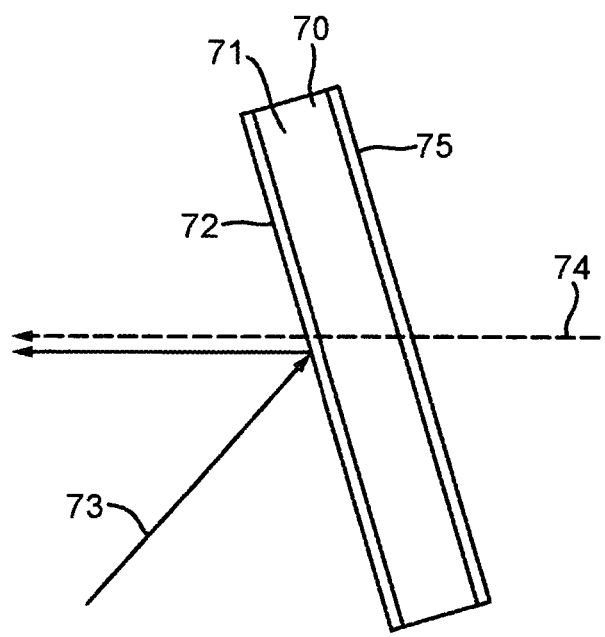
FIG. 4 illustrates a cross-sectional view of a combiner.

FIG. 4 shows a cross-section view of the combiner 70. The combiner comprises an optically transparent planar substrate 71 typically made from glass. An optically reflective coating 72 is provided on one surface of the substrate. The coating may be a multi-layer dielectric coating having thicknesses and dielectric properties selected to be reflective to wavelengths present in the image-bearing light 73 (e.g. monochromatic, or multi-spectral) output from the waveguide but transmissive to wavelengths in light 74 from the external world scene. An anti-reflective layer 75 is provided on an opposing surface of the substrate configured to increase the transmission efficiency of light through the combiner. The anti-reflective layer may for example have a thickness of a quarter wavelength designed to produce interference to allow greater transmission.

The wavelength selective coating 72 on the combiner improves efficiency by increasing the reflectance of the wavelengths used by the display device whilst also allowing transmission of the external scene.

Referring back to FIG. 3, the waveguide unit is arranged to output the image-bearing light from the output grating in a direction generally away from the viewer, and towards the combiner unit for reflection from the planar surface of the combiner unit which is generally facing the output grating, and the viewer.

The combiner unit is positioned and orientated to direct the output of the waveguide display unit towards the combiner unit for back-reflection to the viewer through the waveguide display unit. This permits a compact arrangement of the waveguide display unit and combiner unit which is generally desirable in space-limited environments such as within vehicles or aircraft (e.g. a cockpit).

The reflected image-bearing light then passes back to the waveguide unit and reaches the output grating thereof. Concurrently, external light from an ambient, external and real-world scene is able to pass through the combiner unit in a direction towards the waveguide unit and, thence, the viewer. Consequently, image-bearing light and external-scene light are combined by the combiner and continue together towards the waveguide unit and the viewer.

Here, the majority of the combined light (reflected light and external-scene light) transmits through the waveguide unit without undergoing diffraction by the output grating. As a result, the majority of the combined light passes through the waveguide unit and on to the viewer for viewing substantially un-deviated.

The viewer ultimately views/receives the released light indirectly via reflection from the combiner unit, and may focus on an image seen by looking at/through the transparent waveguide output area which permits light from the ambient, external and real-world scene to also enter the viewer's eye through the waveguide output area (without being guided). In this way, a desired image may be seen to overlay the external scene.

The embodiments described above are intended to provide illustrative examples of the invention to aid understanding and it will be appreciated that modifications, equivalents and variants to these embodiments, such as would be readily apparent to the skilled person, are encompassed within the scope of the invention, e.g. such as is defined by the claims

The invention claimed is:

1. A display apparatus for use in displaying an image to a viewer, the apparatus comprising:
    an optical waveguide arranged to receive image-bearing light into the optical waveguide to guide the received image-bearing light therealong to an output part of the optical waveguide for output of the image-bearing light in a first direction away from the viewer; and,
    a combiner arranged separately from and adjacent to the output part of the optical waveguide for receiving the image-bearing light output by the waveguide in the first direction away from the viewer and then for reflecting the image-bearing light output by the waveguide in a second direction which passes back through the optical waveguide and toward the viewer, and the combiner further arranged for allowing light from an external scene to pass through the combiner in said second direction through the optical waveguide to combine said light from said external scene with said reflected image-bearing light so that said image-bearing light overlays said light from said external scene for viewing by a viewer, wherein said optical waveguide and said combiner are nonparallel and mutually orientated to converge towards each other at or adjacent the output part of the waveguide.

2. A display apparatus according to claim 1 wherein the output part of the optical waveguide is substantially planar and arranged to output said image-bearing light in an output direction which is substantially perpendicular to the plane thereof, and the combiner has a generally planar surface which is orientated obliquely relative to the plane of the output part for said reflecting of image-bearing light obliquely.

3. A display apparatus according to claim 1 wherein said optical waveguide is substantially transparent to light at optical wavelengths conveying said image-bearing light and said external scene, and said combiner is substantially transparent to light at optical wavelengths conveying said external scene and more reflective than transmissive at optical wavelengths conveying said image-bearing light.

4. A display apparatus according to claim 3 in which the combiner includes a reflective coating which is predominantly reflective at optical wavelengths conveying said image-bearing light and predominantly transmissive at optical wavelengths conveying said external scene, thereby to increase the reflection of image-bearing light therefrom and the transmission of light conveying said external scene therethrough.

5. A display apparatus according to claim 3 in which the combiner includes an anti-reflective coating which is predominantly transmissive at optical wavelengths conveying said external scene, thereby to increase the efficiency of transmission of light conveying said external scene therethrough.

6. A display apparatus according to claim 1 in which the waveguide includes an input diffraction grating for receiving image-bearing light and directing the received image-bearing light into the optical waveguide by diffraction, for guiding therealong.

7. A display apparatus according to claim 6 in which the waveguide includes an intermediate diffraction grating between the input diffraction grating and the output part for receiving image-bearing light from the input diffraction grating and expanding the image-bearing light in a first dimension generally transverse to the direction of guidance of light towards the output part.

8. A display apparatus according to claim 7 in which the output part includes an output diffraction grating for expanding the image-bearing light in a second dimension generally transverse to the first dimension, and to output the result.

9. A display apparatus according to claim 1 including an image source arranged for providing an image-bearing light output, for input to the optical waveguide.

10. A display apparatus according to claim 1 in which the optical waveguide is a plate-like waveguide arranged to guide light therealong by total internal reflection between opposing substantially parallel sides of the waveguide.

11. A display apparatus according to claim 1 in which the optical waveguide is a rod-like waveguide arranged to guide light therealong by total internal reflection between opposing substantially parallel sides of the waveguide.

12. A projection display apparatus comprising the display apparatus of claim 1 for projecting said image-bearing light and light from a said external scene concurrently to a viewer so that said image-bearing light overlays light from said external scene for viewing by the viewer.

13. An aircraft or vehicle including a transparent canopy or windscreen and a display apparatus according to claim 1 wherein the combiner is located and arranged to allow an occupant to view through the combiner and through the optical waveguide said external scene, said external scene being a scene external to the aircraft or vehicle, so that said image-bearing light overlays light from said external scene.

14. An aircraft or vehicle according to claim 13 wherein the display apparatus is a projection display apparatus.

15. The display apparatus according to claim 1, wherein the optical waveguide is positioned between the combiner and an intended viewing position of the viewer.

16. The display apparatus according to claim 1, wherein the image-bearing light output by the optical waveguide in the first direction is perpendicular to a planar surface of the waveguide, and the image-bearing light output by the optical waveguide in the second direction is not perpendicular to the planar surface of the waveguide.

17. A method for displaying an image to a viewer, the method comprising:
receiving image-bearing light into an optical waveguide to guide the received image-bearing light therealong to an output part of the optical waveguide and outputting the received image-bearing light in a first direction away from the viewer;
reflecting, by a combiner arranged separately from and adjacent to the output part of the optical waveguide, image-bearing light output by the waveguide in a second direction which passes back through the optical waveguide and toward the viewer, and the combiner further arranged for allowing light from an external scene to pass through the combiner in said second direction through the optical waveguide to combine said light from said external scene with said reflected image-bearing light so that said image-bearing light overlays said light from said external scene for viewing by a viewer, wherein said optical waveguide and said combiner are nonparallel and mutually orientated to converge towards each other at or adjacent the output part of the waveguide.

18. A display apparatus for use in displaying an image to a viewer, the apparatus comprising:
an optical waveguide arranged to receive image-bearing light into the optical waveguide to guide the received image-bearing light therealong to an output part of the optical waveguide for output of the image-bearing light in a first direction away from the viewer;
an input diffraction grating for receiving image-bearing light and directing the received image-bearing light into the optical waveguide by diffraction, for guiding therealong; and
a combiner arranged separately from and adjacent to the output part of the optical waveguide for receiving the image-bearing light output by the waveguide in the first direction away from the viewer and then for reflecting the image-bearing light output by the waveguide in a second direction which passes back through the optical waveguide and towards the viewer, and the combiner further arranged for allowing light from an external scene to pass through the combiner in said second direction through the optical waveguide to combine said light from said external scene with said reflected image-bearing light so that said image-bearing light overlays said light from said external scene for viewing by a viewer;

wherein said optical waveguide is substantially transparent to light at optical wavelengths conveying said image-bearing light and said external scene, and said combiner is substantially transparent to light at optical wavelengths conveying said external scene and more reflective than transmissive at optical wavelengths conveying said image-bearing light;

wherein said optical waveguide and said combiner are nonparallel and are mutually orientated to converge towards each other at or adjacent the output part of the waveguide.

19. A display apparatus according to claim 18 in which the waveguide includes an intermediate diffraction grating between the input diffraction grating and the output part for receiving image-bearing light from the input diffraction grating and expanding the image-bearing light in a first dimension generally transverse to the direction of guidance of light towards the output part.

20. A display apparatus according to claim 19 in which the output part includes an output diffraction grating for expanding the image-bearing light in a second dimension generally transverse to the first dimension, and to output the result.

21. A display apparatus according to claim 18 including an image source arranged for providing an image-bearing light output, for input to the optical waveguide.

* * * * *